United States Patent Office.

IMPROVED CEMENT.

ADOLPH S. JOURDAN, OF NASHVILLE, TENNESSEE.

Letters Patent No. 59,771, dated November 20, 1866; antedated November 9, 1866.

SPECIFICATION.

TO ALL WHOM IT MAY CONCERN:

Be it known that I, ADOLPH S. JOURDAN, of Nashville, in the county of Davidson, and State of Tennessee, have invented a New and Improved Cement, and I do hereby declare that the following is a full and exact description of the same:

This improved cement consists of shellac and pumice stone.

Take one pound of nearly white shellac, and one pound of finely powdered pumice stone, put them together in an iron or other suitable vessel, free from any oily coating, and melt them over a very gentle fire—too much heat must be avoided—and mix them well by constantly stirring the mass. When thoroughly melted and mixed, take it from the fire, and, still stirring, allow the mass to cool down to a degree that it can be formed into such a shape as may be desired.

This cement may be used for all purposes to which other cements are applied, and is particularly applicable for mending stone and marble, as well as fastening iron and glass together.

To use this cement, the surfaces to be joined must be cleaned and heated a little and the cement melted, and by means of a brush applied very thin on smooth, and a little thicker on rough surfaces. By stone or marble the cement is applied in the same manner. To mend small pieces broken out on the corner of the stone or marble, some of the material is finely powdered and mixed with the melted cement until the mass becomes a thick paste, with which the broken-out places are filled out. When perfectly dry and hardened, these mended parts may be ground and polished.

What I claim as my invention, and desire to secure by Letters Patent, is—

The herein-described cement, consisting of shellac and pumice stone, substantially as set forth.

ADOLPH S. JOURDAN.

Witnesses:
G. N. JENKINS,
T. V. NICHOLS.